UNITED STATES PATENT OFFICE.

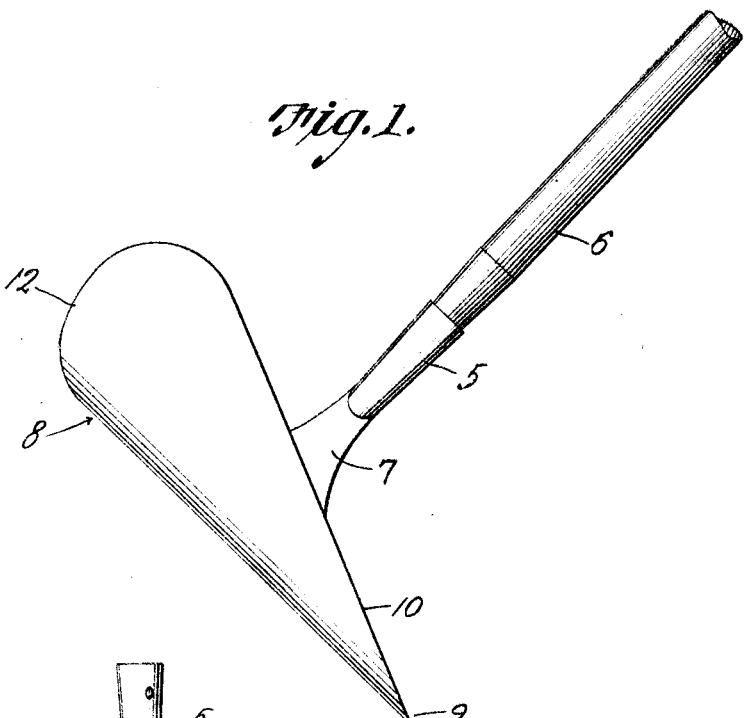
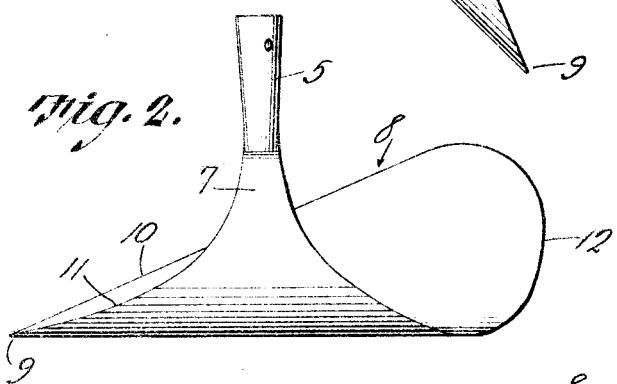
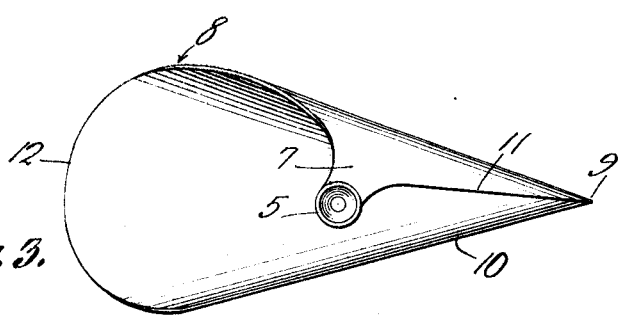

AMBROSE B. CHABOT, OF SEATTLE, WASHINGTON.

HOE.

1,190,108.

Specification of Letters Patent.

Patented July 4, 1916.

Application filed October 14, 1915. Serial No. 55,831.

*To all whom it may concern:*

Be it known that I, AMBROSE BLAZE CHABOT, a citizen of the United States, residing at Seattle, in the county of King and State of Washington, have invented certain new and useful Improvements in Hoes, of which the following is a specification.

This invention relates to an improved hoe, one object of the invention being the provision of a hand tool that is to be attached upon the end of a handle, and the blade of which is so shaped as to render the same especially adapted for ditching lawns, weeding lawns or gardens, and for use in transplanting small flowers and plants.

A further object of the invention is the provision of a curved or semi-cone shaped blade having a handle receiving socket integral therewith.

In the accompanying drawings:—Figure 1 is a side elevation of the complete hoe, with its handle. Fig. 2 is an enlarged view taken from the opposite side of the blade only. Fig. 3 is a top plan view of the blade.

Referring to the drawings, the numeral 5 designates the handle receiving socket to receive the handle 6, which for the use intended is slightly larger than an ordinary hoe handle.

The connecting portion 7 is slightly offset from the socket, and carries the blade 8, the socket being disposed to be directly perpendicular to the longitudinal center line leading from the point 9, of the blade. The body of the blade is curved semi-cone shape, and is provided with the sharp cutting edges 10 and 11, leading from the point 9, while the rear edge 12 is also sharpened to provide an earth cutting edge.

It will be noted that the rear edge 12 in top plan is oval shaped and thus produces a good edge for cutting in regular hoe fashion, while the pointed end is especially adapted for ditching and lawn weeding. In other words with a tool made according to the shape shown and described, the pointed end can be used as a weeder, lawn ditcher and plant transplanter, while the oval cutting edge may be used as a hiller for corn, potatoes, and the like, and a ditcher for shrubs and trees. The straight cutting edge 11, can be used in the place of a regular hoe.

In practice I have found the tool to be most useful about the farm and garden, and also upon the lawn, as all of the various operations necessary with cultivation may be carried out with this single tool.

What I claim, as new, is:—

1. An agricultural tool, including a semi-cone shaped blade, all the edges of which are cutting edges, and an integral handle receiving socket carried thereby.

2. An agricultural tool, including a handle receiving member, and a blade having a point, the edges of which converge, one terminating intermediate of its ends in the handle receiving member and the other in an oval shaped edge, the body of the blade being curved into a semi-cone shape.

In testimony whereof I affix my signature.

AMBROSE B. CHABOT.